US008188689B2

(12) United States Patent
Shek

(10) Patent No.: US 8,188,689 B2
(45) Date of Patent: May 29, 2012

(54) INDUCTION ACTIVATED COVER ASSEMBLY

(76) Inventor: Michael Shek, San Mateo, CA (US)

( * ) Notice: Subject to any disclaimer, the term of this patent is extended or adjusted under 35 U.S.C. 154(b) by 387 days.

(21) Appl. No.: 12/569,789

(22) Filed: Sep. 29, 2009

(65) Prior Publication Data

US 2011/0074316 A1 Mar. 31, 2011

(51) Int. Cl.
*B60K 6/36* (2007.10)

(52) U.S. Cl. ................................................ 318/9; 318/3

(58) Field of Classification Search .................. 318/3, 9, 318/12, 14, 15

See application file for complete search history.

(56) References Cited

U.S. PATENT DOCUMENTS 4,489,810 A * 12/1984 Curtis ........................ 312/272.5
4,996,467 A * 2/1991 Day .............................. 318/480
5,337,581 A * 8/1994 Lott ................................ 62/264
6,752,476 B2 * 6/2004 Lin .............................. 312/290
6,774,586 B1 * 8/2004 Shih .................................. 318/9
6,812,655 B1 * 11/2004 Wang et al. ....................... 318/3

* cited by examiner

*Primary Examiner* — Rina Duda

(57) ABSTRACT

An induction activated cover assembly includes a main body, a cover, a covering plate and two pivots. The main body has an opening vertically penetrating the main body. A lateral connecting groove is formed on a top surface of the main body. Two through holes are formed on two ends of the connecting groove respectively. The cover is pivotably disposed on the main body. A lateral connecting body is formed on a rear end of the cover, and the connecting body has a connecting body opening facing downward. Two pivot bores are formed on two ends of the connecting body. The covering plate encloses the connecting body opening. A receiving room is defined between the connecting body and the covering plate for the pivots to be received therein. Each pivot inserts through one of the pivot bores and its corresponding through hole to pivot the cover on the main body.

11 Claims, 6 Drawing Sheets

INDUCTION ACTIVATED COVER ASSEMBLY

BACKGROUND OF THE INVENTION

1. Field of the Invention

The present invention relates to an induction activated cover assembly which is adapted to be installed on a container.

2. Description of the Prior Art

A container, such as a trash can, has many forms. For example, a container may have an open top, or it may have a cover which is controlled by a pedal.

In addition, a modern container has an induction activated cover assembly, such as disclosed in Applicant's prior proposed application US 2008/0264945, in which the cover thereof opens automatically as the sensor detects a user approaching.

US 2008/0084647 discloses similar cover assembly.

It is to be noted that those cover assemblies have pivots as well as torsion springs being exposed to the surrounding. Because such cover assemblies are often installed on a trash can, which is a rather dirty and wet environment, the pivots and springs thereof are easily smeared. However, electronic devices such as the cover assemblies are not suitable to be washed, the uneven portions, such as the pivots and the springs, unavoidably becomes a hotbed of microbes as well as a blind spot of pollution.

Moreover, conventional cover assembly has a DC motor powered by several rows of batteries. However, such batteries arranged in several rows will narrow the opening of the cover assembly, which leads to inconvenience of the users.

SUMMARY OF THE INVENTION

The main object of the present invention is to provide an induction activated cover assembly that pivots thereof are not exposed to the surroundings.

To achieve the above object, a cover assembly of the present invention includes a main body, a cover, a covering plate, two pivots, an induction unit and a driving unit. The main body has an opening vertically penetrating the main body. A rear chamber is defined by the main body, and a lateral connecting groove is formed on a top surface of the main body. The rear chamber and the connecting groove are located behind the opening. Two through holes are formed on two ends of the connecting groove respectively. The cover pivotably disposed on the main body to move pivotably between an open position and a close position. A lateral connecting body is formed on a rear end of the cover. The connecting body has a connecting body opening facing downward. Two pivot bores are formed on two ends of the connecting body and corresponding to the through holes. The covering plate encloses the connecting body opening. A receiving room is defined between the connecting body and the covering plate for the pivots to be received therein. Each pivot inserts through one of the pivot bores and its corresponding through hole to pivot the cover on the main body.

Because the pivots are installed in a receiving room enclosed by the covering plate, the pivot means of the cover assembly has an even surface for users to clean conveniently.

The present invention will become more obvious from the following description when taken in connection with the accompanying drawings, which show, for purpose of illustrations only, the preferred embodiments in accordance with the present invention.

BRIEF DESCRIPTION OF THE DRAWINGS

FIG. 2A is a drawing showing a covering plate of the present invention from another view angle.

DETAILED DESCRIPTION OF THE PREFERRED EMBODIMENTS

Figure 1:
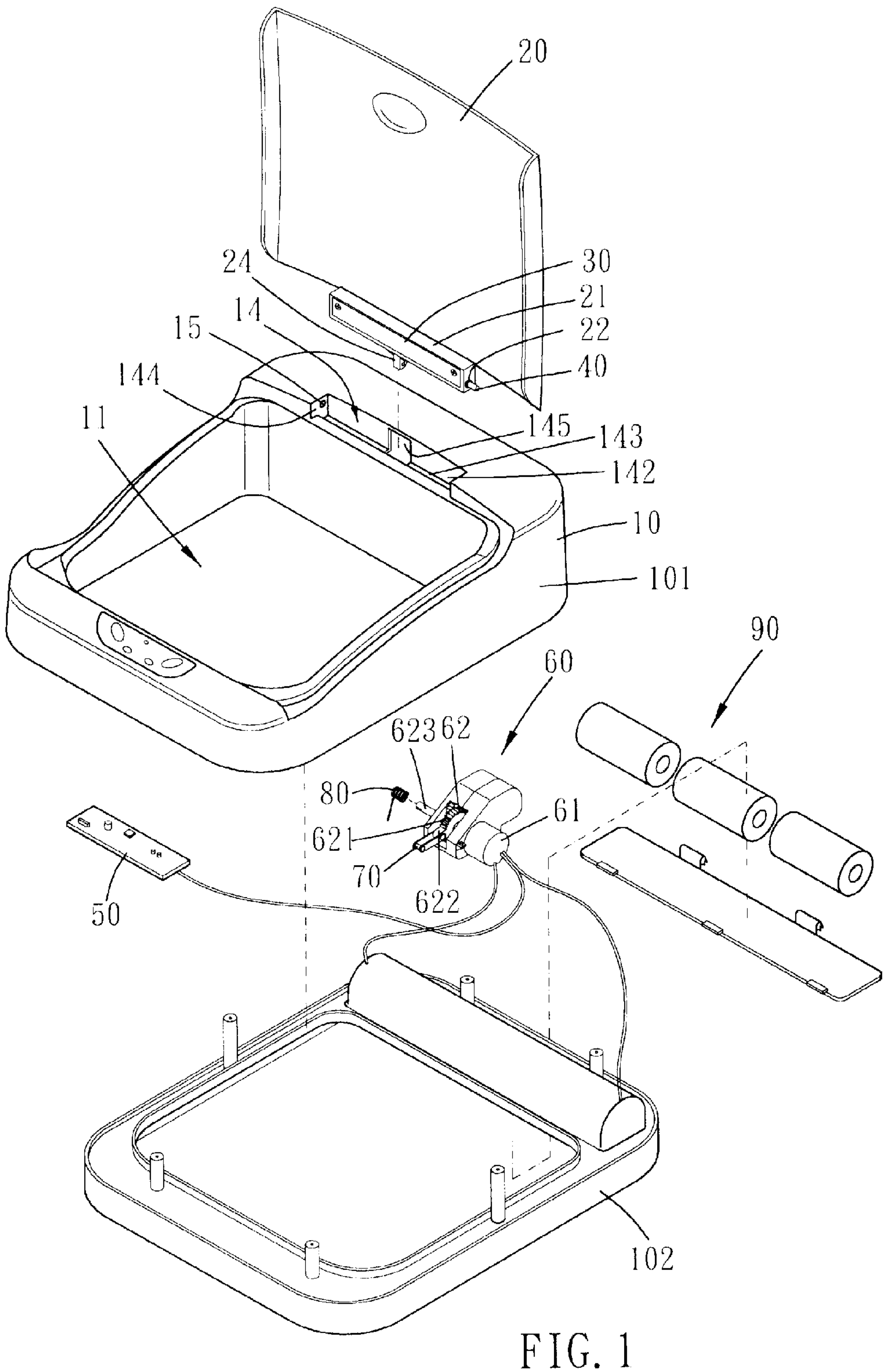
FIG. 1 is a breakdown drawing showing a cover assembly of the present invention.

Please refer to FIG. 1 to FIG. 4 for a preferred embodiment of the present invention. An induction activated cover assembly includes a main body 10, a cover 20, a covering plate 30, two pivots 40, an induction unit 50 and a driving unit 60. The cover assembly is installed on a container which has a storage cavity, e.g. the container may be a trash can.

The main body 10 has an opening 11 vertically penetrating the main body 10. The opening 11 communicates with the storage cavity of the container for a user to drop garbage therethrough. A front chamber 12 and a rear chamber 13 are defined by the main body 10, and a lateral connecting groove 14 is formed on a top surface of the main body 10. The rear chamber 13 and the connecting groove 14 are located behind the opening 11, and the front chamber 12 is located in front of the opening 11. Two through holes 15 are respectively formed on two ends of the connecting groove 14. Specifically, the main body 10 of the present invention includes an upper portion 101 and a lower portion 102, and the front and rear chambers 12 and 13 are defined between the upper and lower portions 101 and 102. The connecting groove 14 is preferably defined by a front wall 141, a rear wall 142, a bottom wall 143 and two side walls 144. The through holes 15 are therefore formed on the side walls respectively. A connecting hole 145 is formed on the connecting groove 14 to communicate the connecting groove 14 with the rear chamber 13. More specifically, the connecting hole 145 is formed on the bottom wall 143 and the rear wall 142.

The cover 20 is pivotably disposed on the main body 10 to move pivotably between an open position and a close position. The opening 11 is open as the cover 20 is at the open position, and the opening 11 is closed as the cover 20 is at the close position. A lateral connecting body 21 is formed on a rear end of the cover 20. The connecting body 21 has a connecting body opening facing downward as the cover 20 locates at the close position. Two pivot bores 22 are formed on two ends of the connecting body 21 and corresponds to the through holes 15 respectively.

The covering plate 30 encloses the connecting body opening. A receiving room 31 is defined between the connecting body 21 and the covering plate 30 for the pivots 40 to be received therein. Each pivot 40 inserts through one of the pivot bores 22 and its corresponding through hole 15 to pivot the cover 20 on the main body 10.

Figure 2:
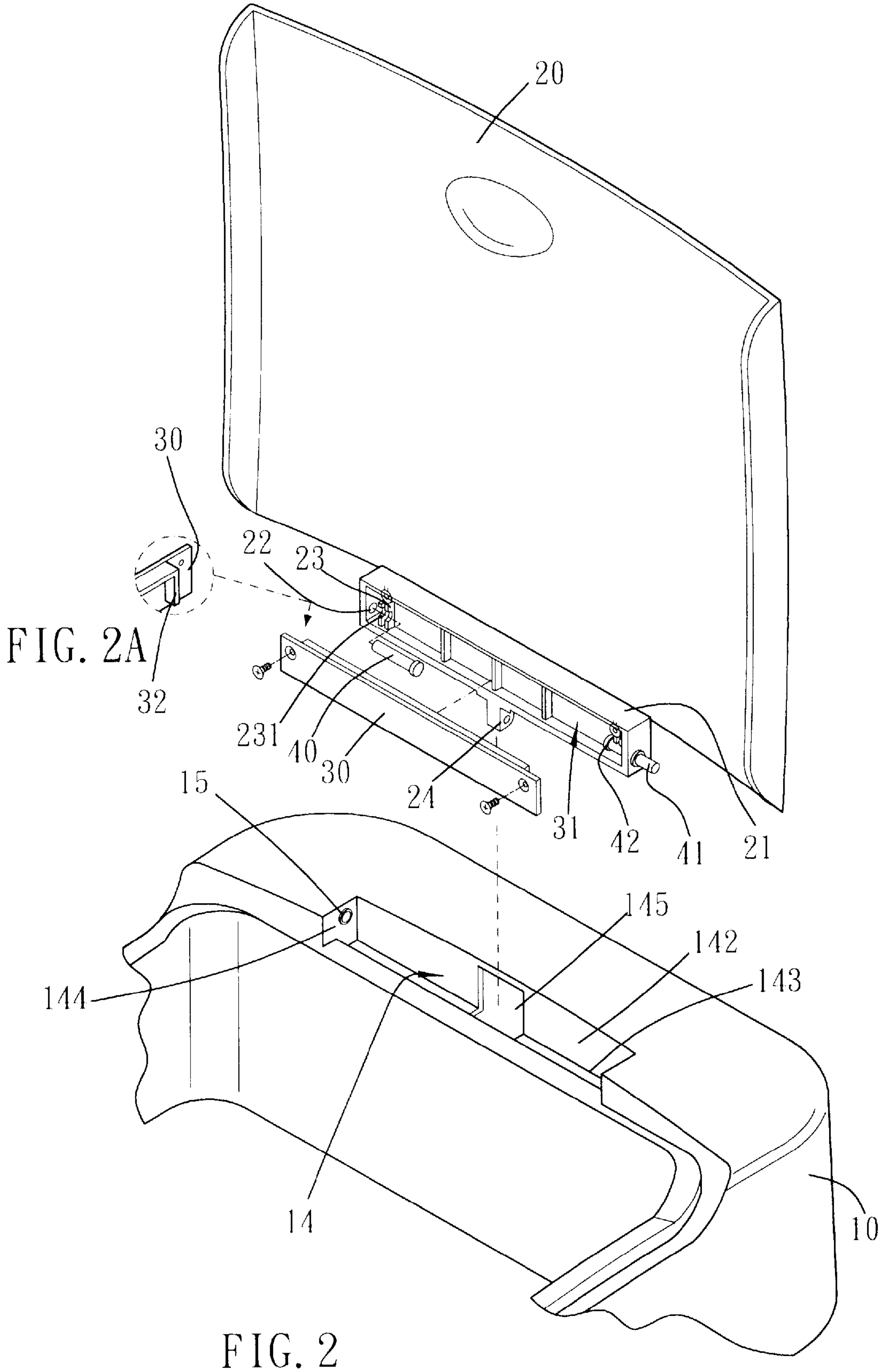
FIG. 2 is a partial breakdown drawing showing a cover and a main body of the present invention.

In the present embodiment, the connecting body 21 has at least one lateral rib 23 (there are two as shown in FIG. 2) disposed near each end of the connecting body 21 and the covering plate 30 has one rim 32 extending toward the connecting body 21 near each end thereof. Each pivot 40 has a cylinder rod 41 and a larger head 42 disposed at one end of the cylinder rod 41. Each rib 23 is formed with an arc notch 231, which has a curvature corresponds to the cylinder rod 41. The head 42 of each pivot 40 is tightly received between the rib 23 and the rim 32, and the cylinder rod 41 is settled on the notch notches 231 and inserts through the pivot bore 22 and the through hole 15, whereby reducing the oscillation of the cover 20.

The induction unit 50 is used for detecting a movement of a target body, i.e. the user. Preferably, the induction unit 50 is disposed in the front chamber 12. The driving unit 60 operatively connects to the induction unit 50. The induction unit 50 selectively activates the driving unit 60 to drive the cover 20 to pivotably move between the open position and the close position as the induction unit 50 detects the target body moving, such as the user approaching.

In the present embodiment, a connecting flange 24 is extended from a rear end of the connecting body 24 rearward. The driving unit 60 includes a motor 61 and a deceleration gear set 62 being in a rotational operative relationship with the motor 61. The deceleration gear set 62 includes a terminal gear unit 621. i.e. all the other gear units of the gear set 62 connect between the terminal gear unit 621 and the motor 61. A protrusion 622 is radially extended from the terminal gear unit 621, and a link pivotably extends through the connecting hole 145 and connects the protrusion 622 to the connecting flange 24. As such, when the motor 61 is activated, the deceleration gear set 62 is driven to rotate the protrusion 622 between a first position and a second position, driving the cover 20 to pivotably move between the open position and the close position respectively. At least one resilient unit 80 and a power source 90 are disposed in the rear chamber 13. The resilient unit 80 provides the cover 20 with a torque force for the cover 20 to have a tendency to pivotably move to the open position. Preferably, an axle 623 is rotational operatively disposed at a center of the terminal gear unit 621, and the resilient unit 80 is sleeved on the axle 623 and connects to the axle 623 at one end thereof. A distal end of the axle 623 may have a slot for the end of the resilient unit 80 to engage therewith. The other end of the resilient unit 80 abuts against a position where suitable. In addition, the power source 90 includes multiple batteries arranged in a row, and the power source 90 electrically connects to the driving unit 60. The power source 90 may further electrically connects to the induction unit 50, either directly or indirectly. For space saving purpose, the driving unit 60 is installed atop the power source 90. Thereby, the power source 90 occupies smaller space so that the opening 11 can have a bigger dimension.

Figure 3:
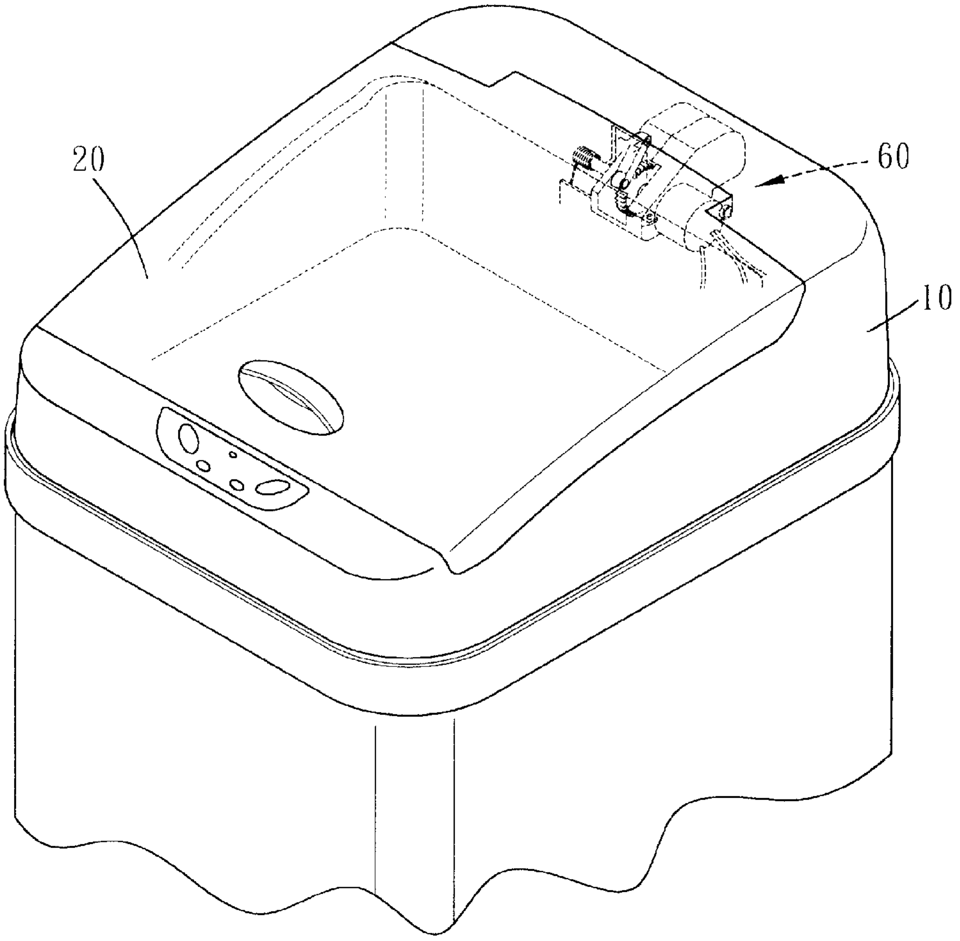
FIG. 3 is a combination drawing showing a cover assembly with its cover at the close position.
Figure 4:
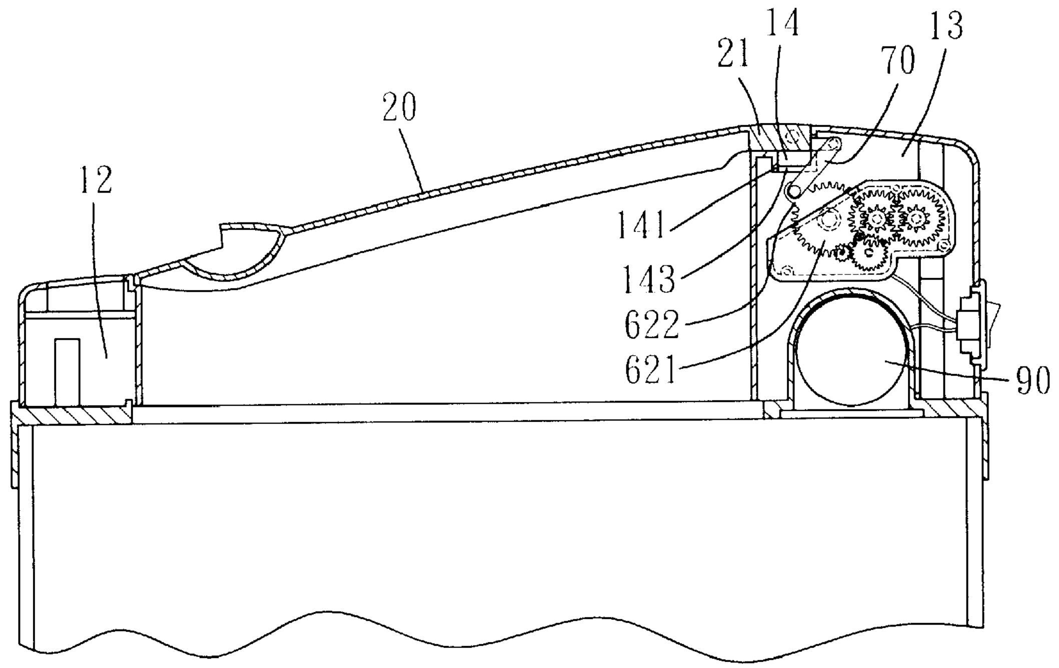
FIG. 4 is a profile showing a cover assembly with its cover at the close position.

As shown in FIG. 3 and FIG. 4, the cover 20 locates at the close position because the driving unit 60 is not activated yet. In this case, the protrusion 622 of the terminal gear unit 621 locates at the second position, the connecting flange 24 substantially extends backward, and the cover 20 encloses the opening 11. Note that a height of the front wall 141 is preferably smaller than that of the rear wall 142, and a height drop between the front and rear walls 141 and 142 is substantially equal to a thickness of the connecting body 24. Thereby, a top surface of the cover 20 is flush with that of a rear portion of the main body 10 as the cover 20 is at the close position, eliminating the uneven joint sections.

Figure 5:
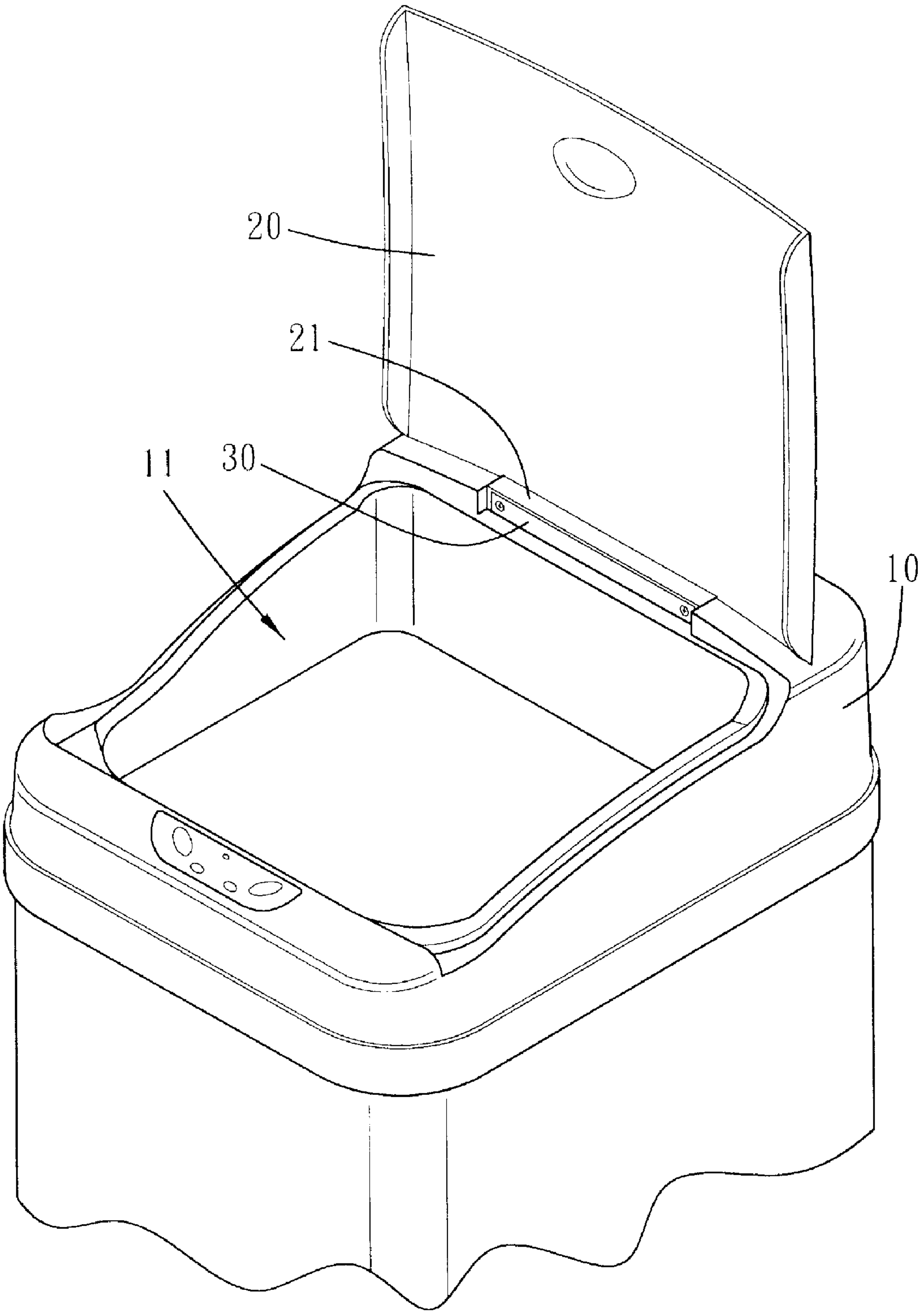
FIG. 5 is a combination drawing showing a cover assembly with its cover at the open position.
Figure 6:
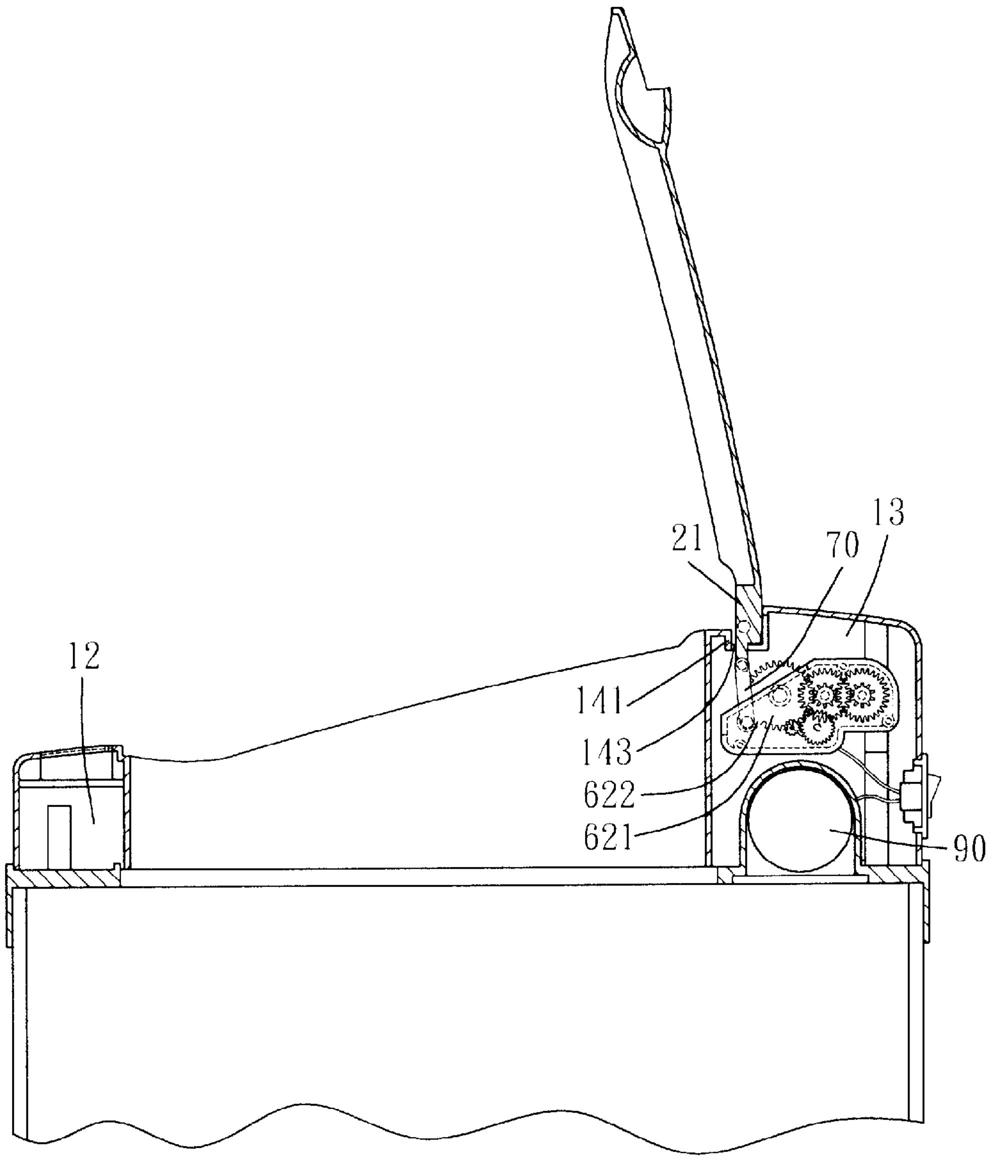
FIG. 6 is a profile showing a cover assembly with its cover at the open position.

Next, please refer to FIG. 5 and FIG. 6. When the induction unit 50 detects a target body moving and approaching, it sends a signal to activate the motor 61. Thereafter, the motor 61 drives the gear set 62 to function, rotating the protrusion 622 of the terminal gear unit 621 to its first position. As such, the connecting flange 24 is pulled downward, and the cover moves to the open position, communicating the opening 11 with the surrounding for the user to drop garbage therefrom. Because the resilient unit 80 provides addition torque force to the cover 20, the load of the motor 61 is therefore reduced, which leads to power saving. Thus a motor 61 with smaller power output, which takes less space and is more economic, can be installed in the cover assembly. In addition, a width of the bottom wall 143 is preferably equal to or at least bigger than the thickness of the connecting body 21. Thereby the connecting body 21 can rest between the front and rear walls 141 and 142 as the cover 20 is at the open position.

As best shown in FIG. 5, the pivot means, such as the pivots, the pivot bores and the through holes, is hidden. That is to say, the pivots of the present invention is installed in the receiving room defined by the connecting body and the covering plate and is therefore not exposed to the surrounding. As such, the cover 20 of the present invention has little uneven surface. The user can, therefore, clean the even surface of the cover 20 with a wiper and remove the stain much more easily.

What is claimed is:

1. An induction activated cover assembly, comprising:

a main body, having an opening vertically penetrating the main body, a rear chamber being defined by the main body, a lateral connecting groove being formed on a top surface of the main body, the rear chamber and the connecting groove being located behind the opening, two through holes being formed on two ends of the connecting groove respectively;

a cover, pivotably disposed on the main body to move pivotably between an open position and a close position, the opening being open as the cover is at the open position, the opening being closed as the cover is at the close position, a lateral connecting body being formed on a rear end of the cover, the connecting body having a connecting body opening facing downward, two pivot bores being formed on two ends of the connecting body and corresponding to the through holes respectively;

a covering plate, enclosing the connecting body opening, a receiving room being defined between the connecting body and the covering plate;

two pivots, disposed in the receiving room, each pivot inserting through one of the pivot bores and its corresponding through hole to pivot the cover on the main body;

an induction unit for detecting a movement of a target body;

a driving unit, operatively connecting to the induction unit, the induction unit selectively activating the driving unit to drive the cover to pivotably move between the open position and the close position as the induction unit detects the target body moving;

at least one resilient unit, being disposed in the rear chamber, the resilient unit providing the cover with a torque force for the cover to have a tendency to pivotably move to the open position.

2. The induction activated cover assembly of claim 1, wherein a connecting flange being extended from a rear end of the connecting body, the driving unit includes a motor and a deceleration gear set being in a rotational operative relationship with the motor, the deceleration gear set includes a terminal gear unit, a protrusion is radially extended from the terminal gear unit, a link connects the protrusion to the connecting flange;

wherein when the motor is activated, the deceleration gear set is driven to rotate the protrusion between a first position and a second position, driving the cover to pivotably move between the open position and the close position respectively.

3. The induction activated cover assembly of claim 2, wherein a connecting groove has a connecting hole communicating the connecting groove with the rear chamber, the link extends through the connecting hole.

4. The induction activated cover assembly of claim 1, wherein an axle is rotational operatively disposed at a center of the terminal gear unit, the resilient unit is sleeved on the axle, and the resilient unit connects to the axle at one end thereof.

5. The induction activated cover assembly of claim 3, wherein the connecting groove is defined by a front wall, a rear wall, a bottom wall and two side walls, a height of the front wall is smaller than that of the rear wall, a height drop between the front and rear walls is substantially equal to a thickness of the connecting body, whereby a top surface of the cover is flush with that of a rear portion of the main body as the cover is at the close position.

6. The induction activated cover assembly of claim 5, wherein the connecting hole is formed on the bottom wall and the rear wall, and the through holes are formed on the side walls respectively.

7. The induction activated cover assembly of claim 5, wherein a width of the bottom wall is no smaller than the thickness of the connecting body, whereby the connecting body rests between the front and rear walls as the cover is at the open position.

8. The induction activated cover assembly of claim 1, wherein a power source is disposed in the rear chamber, the power source includes multiple batteries arranged in a row, and the power source electrically connects to the driving unit.

9. The induction activated cover assembly of claim 8, wherein the driving unit is disposed atop the power source.

10. The induction activated cover assembly of claim 1, wherein a front chamber is defined by the main body, the front chamber is located in front of the opening, the induction unit is disposed in the front chamber.

11. The induction activated cover assembly of claim 1, wherein the connecting body has at least one lateral rib disposed near each end of the connecting body, and the covering plate has one rim extending toward the connecting body near each end thereof, each pivot includes a cylinder rod and a larger head disposed at one end of the cylinder rod, each rib is formed with an arc notch, a curvature of the arc notch corresponds to the cylinder rod, the head of each pivot is tightly received between the rib and the rim, and the cylinder rod is settled on the arc notch and inserts through the pivot bore and the through hole, whereby reducing the oscillation of the cover.

* * * * *